(12) United States Patent
Hartnett et al.

(10) Patent No.: US 12,351,205 B2
(45) Date of Patent: Jul. 8, 2025

(54) LANE SEGMENT CLUSTERING USING HYBRID DISTANCE METRICS

(71) Applicant: ARGO AI, LLC, Pittsburgh, PA (US)

(72) Inventors: Andrew Hartnett, West Hartford, CT (US); George Peter Kenneth Carr, Allison Park, PA (US); Nikolai Popov, Munich (DE)

(73) Assignee: Volkswagen Group of America Investments, LLC, Reston, VA (US)

( * ) Notice: Subject to any disclaimer, the term of this patent is extended or adjusted under 35 U.S.C. 154(b) by 486 days.

(21) Appl. No.: 17/846,630

(22) Filed: Jun. 22, 2022

(65) Prior Publication Data

US 2023/0415766 A1     Dec. 28, 2023

(51) Int. Cl.
*G06F 18/23* (2023.01)
*B60W 60/00* (2020.01)
*G01C 21/34* (2006.01)
*G06V 20/56* (2022.01)

(52) U.S. Cl.
CPC ....... *B60W 60/001* (2020.02); *G01C 21/3415* (2013.01); *G01C 21/3461* (2013.01); *G06V 20/588* (2022.01); *B60W 2420/403* (2013.01); *B60W 2420/408* (2024.01); *B60W 2552/53* (2020.02)

(58) Field of Classification Search
CPC ......... B60W 60/001; B60W 2420/403; B60W 2420/408; B60W 2552/53; B60W 40/06; G01C 21/3415; G01C 21/3461; G06V 20/588; G06F 18/23

USPC ......................................................... 382/170
See application file for complete search history.

(56) References Cited

U.S. PATENT DOCUMENTS

| | | |
|---|---|---|
| 2019/0113918 A1 | 4/2019 | Englard et al. |
| 2021/0261126 A1 | 8/2021 | Karamanov et al. |
| 2022/0048498 A1 | 2/2022 | Khandelwal et al. |
| 2022/0126831 A1 | 4/2022 | Foil et al. |
| 2022/0135078 A1 | 5/2022 | Refaat et al. |
| 2022/0326714 A1* | 10/2022 | Goyal ............... B60W 60/0027 |

OTHER PUBLICATIONS

International Search Report and Written Opinion of the International Searching Authority directed to related International Patent Application No. PCT/US2023/025954, mailed Oct. 19, 2023; 8 pages.

* cited by examiner

*Primary Examiner* — Charlotte M Baker
(74) *Attorney, Agent, or Firm* — Sterne, Kessler, Goldstein & Fox P.L.L.C.

(57) ABSTRACT

Disclosed herein are system, method, and computer program product embodiments for clustering lane segments of a roadway in order to improve and simplify autonomous vehicle behavior testing. The approaches disclosed herein provide a hybrid methodology of dividing lane segments into hard features and soft features, and using a metric learning model trained in a supervised process on the entirety of lane segment features to cluster the lane segments based on the soft features. These clustered lane segments can then be assigned to what is termed as protolanes, where a single set of tests applied to a given protolane is considered valid across all of the lane segments assigned to the protolane.

20 Claims, 9 Drawing Sheets

600A

Are these lanes equivalent?   ☐ No

☐ Yes

600B

A

B

C

☐ None

Is this lane equivalent to any of these lanes?

LANE SEGMENT CLUSTERING USING HYBRID DISTANCE METRICS

CROSS-REFERENCE TO RELATED APPLICATIONS

This application is related to U.S. patent application Ser. No. 17/846,641, entitled "PROTOLANES FOR TESTING AUTONOMOUS VEHICLE INTENT" to Carr et al., filed herewith, which is incorporated by reference herein in its entirety. This application is also related to U.S. patent application Ser. No. 17/846,652, entitled "VALIDATING PROTOLANES WITH ACTOR BEHAVIOR FLOWCHARTS" to Carr et al., filed herewith, which is incorporated by reference herein in its entirety. This application is further related to U.S. patent application Ser. No. 17/846,656, entitled "TESTING REUSE ACROSS PROTOLANE FAMILIES" to Carr et al., filed herewith, which is incorporated by reference herein in its entirety.

BACKGROUND

With the advent of autonomous vehicle technology have come increased concerns about their abilities, especially compared to manual control by a human operator. With a human operator in control of a vehicle, it is possible for the operator to adapt on-the-fly in order to successfully navigate through any of a large number of scenarios that may arise over the course of driving. This adaptability, while it may be mimicked to some extent by autonomous vehicle systems, has not currently been duplicated by even the most intelligent of artificial intelligence systems.

Instead, autonomous vehicles obtain information about their surroundings using a variety of sensors (such as optical, radar, and lidar sensors) in order to construct an understanding of the world around them. Using this information, in conjunction with other information made available to vehicle systems ahead of time, it is possible for the vehicle to make decisions that would similarly allow for successful navigation through any of a large number of scenarios that may arise.

The potential for safe and reliable operation of such autonomous vehicle systems has been demonstrated through extensive real world use. When properly designed and constrained, autonomous vehicle systems are, in general, even markedly safer than human operators.

However, as conditions change for the operation of autonomous vehicles, including trusting autonomous vehicle systems to operate safely without any possibility for operator intervention in more complex situations and environments, it is necessary to gain the trust of the public, consumers, governments, and other stakeholders by ensuring that the autonomous vehicle will operate safely under virtually all possible circumstances.

Accordingly, what is needed are techniques to provide evidence of the safe operation of autonomous vehicles.

SUMMARY

Disclosed herein, in accordance with aspects, are systems, methods, and computer program products for grouping a set of lane segments based on trained labels from a supervised learning process, wherein the trained labels are applicable to a plurality of features of the set of lane segments. Distances corresponding to the set of lane segments in the set of lane segments are calculated based on individual features of the set of lane segments assessed by a metric learning model trained with the trained labels. And the set of lane segments are clustered based on the distances.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
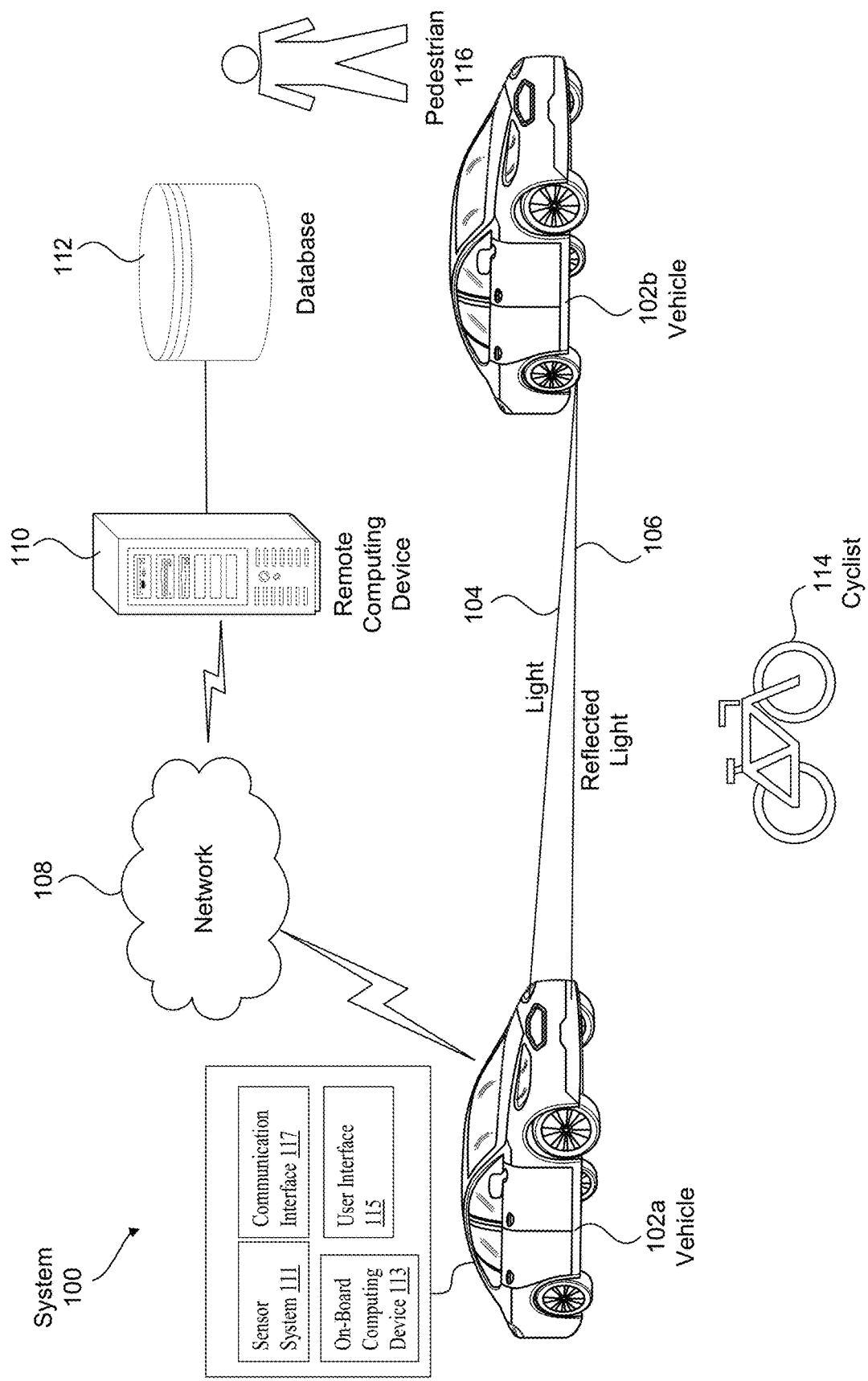
FIG. 1 illustrates an exemplary autonomous vehicle system, in accordance with aspects of the disclosure.

Provided herein are system, apparatus, device, method and/or computer program product embodiments, and/or combinations and sub-combinations thereof, for clustering lane segments of roadways based on similarities among sets of features of the lane segments. One of the more complex aspects of autonomous vehicle system design involves simplifying testing and understanding of the decisions made by the systems in order to prove safety of operation. The space of variation in the testing and verification of autonomous vehicle systems is significantly larger than most other systems.

By appropriately clustering lane segments, it can be possible to assess the viability of testing a given cluster of lane segments as a unit in order to prove the safety of the system's performance across all lane segments in that cluster. However, for any set of roadways (e.g., in a given metropolitan area), lane segments will be as varied as the count of individual lane segments, and determining a basis by which to cluster similar lane segments given certain features can be challenging.

One approach can be a rule-based clustering determined by hard features of the lane segments. For example, lane segments can be readily separated on the basis of certain hard features, such as whether there is a crosswalk present or not, whether there is a railroad crossing present or not, how many adjacent lanes of traffic are present, or whether the flow of traffic is controlled by traffic lights or not, by way of non-limiting example. However, lane segments have many other relevant differentiating features that are challenging to readily decide whether a given lane segment should be grouped with one set of lane segments versus another on that basis. For example, it is more challenging to separate lane segments based on features such as lane width or lane curvature. While a wide boulevard stands in stark contrast to a narrow alleyway in terms of width, the distinction becomes one of degree, and deciding where to draw the line can be a highly subjective process on a quick visual assessment made by a human.

Existing techniques in the space of distance metric learning provide one approach that can be applied, with application-specific requirements, to clustering lane segments for this purpose. Those skilled in the relevant arts will appreciate that such techniques are understood in the art, as described by Xing et al., "Distance metric learning, with application to clustering with side-information," Proceedings of the 15th International Conference on Neural Information Processing Systems (NIPS'02), MIT Press, Cambridge, MA, USA, 521-528 (2002). This technique, in combination with other known techniques such as K-means clustering, can be used as a basis for simplifying both the assessment of how to initially group lane segments, as well as determining whether a given cluster of lane segments is at the correct level of granularity.

Throughout this disclosure, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
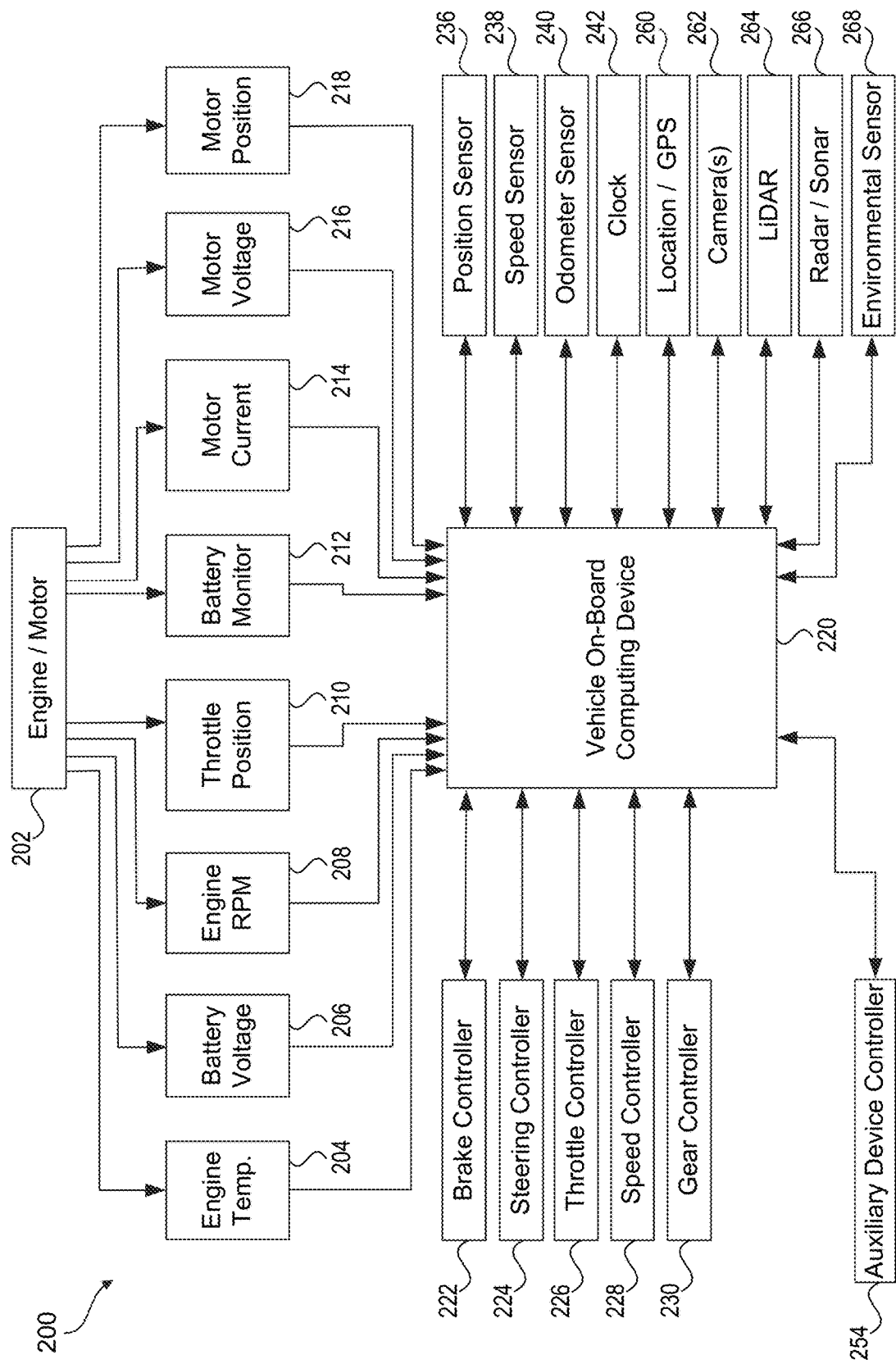
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 7. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or RADAR data, camera images, etc.) in order to identify objects and/or features in the environment of AV 102a. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

In some embodiments, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

By way of non-limiting example, an AV can be deployed to drive around roadways corresponding to a geonet. In this context, a geonet is used to refer to a collection of lane segments within a map (which may or may not ultimately be used by the AV to make driving decisions). The actual or simulated behavior of the AV at various lane segments can be verified against the appropriate expected behaviors for the lane segments in order to determine whether the AV is operating correctly and as expected.

A geonet may have a quantity of lane segments numbering upwards of 100,000. In order to validate the behavior of the AV across each one of those 100,000+ lane segments, individual testing protocols would have to be devised for every single individual lane segment, resulting in countless hours spent in the design of the tests, let alone in executing the tests themselves.

By grouping the lane segments into sets of lane segments that are sufficiently similar that they could be tested together as a unit, a same set of tests can be applied to the AV's actual or simulated performance on any one of those lane segments in the set in order to validate the AV's performance across all of the lane segments in that set at once. This reduces the test space from 100,000+ individual lane segments, to some number corresponding to however many lane segment sets are present.

Groups of these lane segments, appropriately selected, can be termed protolanes. The concept of protolanes used in this manner is introduced in U.S. patent application Ser. No. 17/846,641, entitled "PROTOLANES FOR TESTING AUTONOMOUS VEHICLE INTENT" to Carr et al., filed herewith, which is incorporated by reference herein in its entirety, and in U.S. patent application Ser. No. 17/846,652, entitled "VALIDATING PROTOLANES WITH ACTOR BEHAVIOR FLOWCHARTS" to Carr et al., filed herewith, which is incorporated by reference herein in its entirety, and in U.S. patent application Ser. No. 17/846,656, entitled "TESTING REUSE ACROSS PROTOLANE FAMILIES" to Carr et al., filed herewith, which is incorporated by reference herein in its entirety. As described therein, protolanes allow the decomposition of the space of roadways driven by an AV based on variations in roadway segments. This allows simplification of roadways into individual segments that can be matched to a corresponding protolane. Depending on the manner in which protolanes are developed, segments of roadways that have variations, but nevertheless share the same set of test cases, can be assigned to a same protolane. Then, by testing and verifying the operation of the AV across possible scenarios for that protolane, by extension the AV has been tested and verified across all roadway segments assigned to that protolane.

While the disclosed approaches herein are intended principally for use in the clustering of lane segments in order to simplify the selection and assignment of protolanes, this usage is provided by way of non-limiting example and not limitation. One skilled in the relevant arts will appreciate that the approaches described herein can be used to cluster lane segments for use in other approaches (e.g., using clustered lane segments in the actual execution of real-time AV piloting decisions). However, for the purposes described herein, clusters of lane segments will be described as selecting for a corresponding protolane for that cluster.

Figure 3:
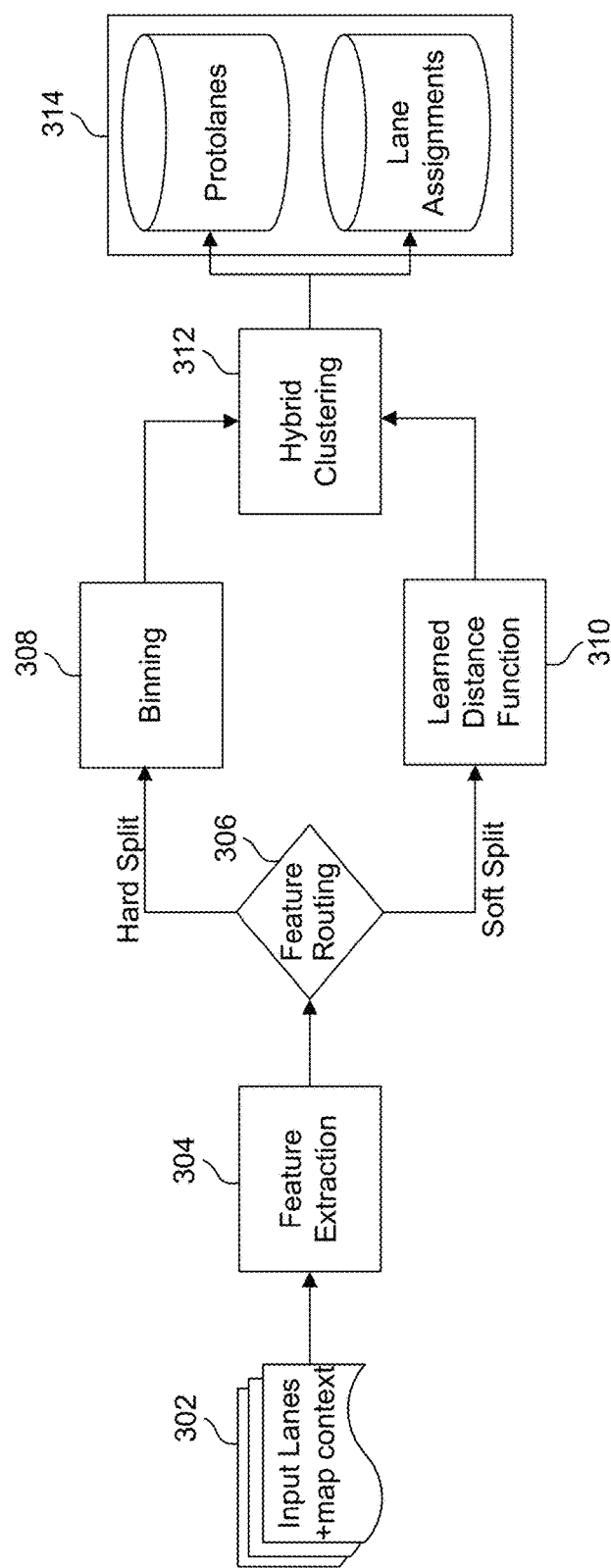
FIG. 3 illustrates a lane segment clustering architecture, in accordance with aspects of the disclosure.

FIG. 3 illustrates a lane segment clustering architecture 300, in accordance with aspects of the disclosure. At block 302, mapping data including lanes with corresponding lane segments and their map context is received, and provided to a feature extraction block 304, in accordance with aspects of the disclosure. Feature extraction block 304 can analyze a given lane segment and determine, for that lane segment, a set of features spanning a large variety of characteristics of the lane segment.

Figure 4:
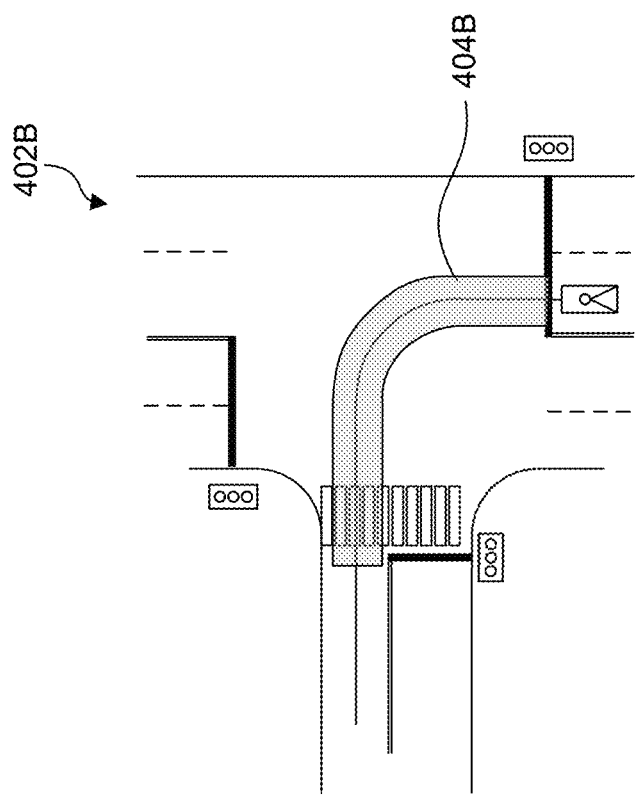
FIG. 4 depicts an exemplary set of protolanes, in accordance with aspects of the disclosure.
Figure 4:
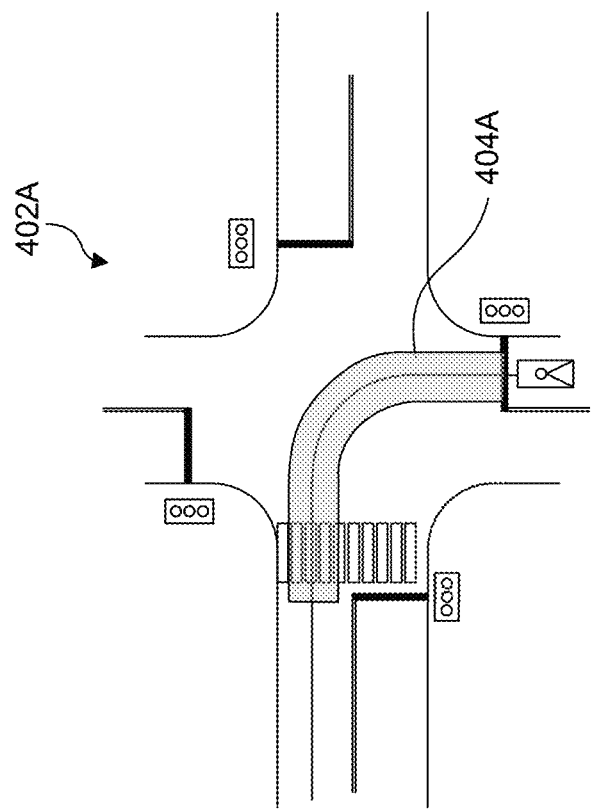

In order to aid the understanding of these features of a lane segment, FIG. 4 is introduced. FIG. 4 depicts two exemplary protolanes 402A and 402B, and corresponding exemplary lane segments 404A and 404B, in accordance with aspects of the disclosure. Protolane 402A illustrates a 4-way traffic light-controlled intersection with an unprotected left turn. Protolane 402B illustrates a 3-way traffic light-controlled intersection with an unprotected left turn across two lanes of traffic. On a quick visual assessment of lane segments 404A and 404B, they share many similarities, and also some differences. For example, in the case where the traffic light provides a left turn signal, oncoming traffic in both lane segments is expected to stop, and the AV could clear the unprotected left turn just the same across a single lane or two lanes. But in a left turn where the AV is expected to yield to oncoming traffic, and an oncoming vehicle is stopped to also turn left, the AV may have sufficient visibility into the behavior of traffic in the single oncoming lane segment 404A to effect a turn. But in the case of lane segment 404B, the AV may need to wait for a gap in the second lane before proceeding.

And, although not expressly depicted in FIG. 4, these two lane segments could have other differentiating features. For example, the width of the oncoming traffic lanes in lane segment 404A may differ from those of lane segment 404B, which may affect the turning radius and path that the AV must follow when making a left turn.

In accordance with an aspect of the disclosure, lane segments can be differentiated, and protolanes can be constructed, based on a combination of hard features and soft features. Hard features, in this context, are binary and exclusionary features. For example, a hard feature may be the presence or absence of a crosswalk within a lane segment. In this determination, any lane segment that intersects a crosswalk should never be mapped to the same protolane as a lane that does not intersect a crosswalk. Another exemplary hard feature may separate lane segments that have an adjacent bike lane from those that do not. Yet another exemplary hard feature may be whether an intersection is or is not governed by a stop sign. And another exemplary hard feature may be whether an intersection is or is not governed by a traffic light. Skilled developers of AV systems will recognize additional hard features that, for completeness of testing and verification, should likely have their binary options mapped to separate protolanes.

In an aspect of the disclosure, hard features are pre-prescribed, and a typical set of hard features may include upwards of several dozen features. In one aspect, 31 separate hard features may be pre-prescribed, which would set an upper bound for the vocabulary of $2^{31}$ protolanes. As a practical matter, these features do not all appear in combination with one another, and so the actual number of combinations of hard features is typically much lower.

Separate, and in addition to these hard features, a set of soft features can be defined, in accordance with aspects of the disclosure. These are features that have real value measurements, as opposed to binary options as with the hard features. For example, soft features may include lane width, bank, grade, curvature, etc. that can provide further clustering and decomposition of the lane segments.

In contrast to the hard features, soft features follow a non-exclusionary principle. For example, a first lane and a slightly wider second lane can both be mapped to the same protolane, as this difference is unlikely to impact testing and verification. In order to determine appropriate ranges of differences for these soft features that can reasonably be mapped to a same protolane, lane segments (for a given hard feature, in an aspect) can be clustered across N-dimensional space, where each dimension corresponds to an individual soft feature. The resulting clusters can be grouped based on a desired number of resulting protolanes, for example, with a single protolane mapped to all of the lane segments within a corresponding cluster.

Returning to FIG. 3, feature routing block 306 can take the set of extracted features from feature extraction block 304, and separate them into hard features and soft features as discussed above. These hard and soft features can then be assessed separately. Since hard features can be readily separated through exclusionary principles using such constructs as a decision tree, these can be routed to a binning block 308 to be clustered in separate bins based on these specific requirements. By binning lane segments, it is possible to separate lane segments into those that do have crosswalks from those that do not have crosswalks into separate corresponding bins, by way of non-limiting example.

Ultimately, these binned lane segments will be used to assess the further similarities of the lane segments within the bin based on the soft features. The binning results are provided to a hybrid clustering block 312, which performs clustering of lane segments to determine protolanes based on the soft features of the lane segments within each bin provided by binning block 308, in accordance with aspects of the disclosure.

The clustering performed by hybrid clustering block 312 based on the soft features of those lane segments as determined by learned distance function 310, in accordance with aspects of the disclosure.

With the clustered lane segments produced by hybrid clustering block 312, a given lane segment can be assigned to a protolane in block 314. As shown in block 314, this information is tracked in two ways—a cluster of lane segments is given a defined protolane for that cluster, and the lane segments within that cluster are assigned to that protolane, in accordance with aspects of the disclosure. By structuring the data this way, any future lane segments can be similarly assessed by determining, based on its hard and soft features, which cluster it belongs to and therefore which protolane it should be assigned.

Figure 5:
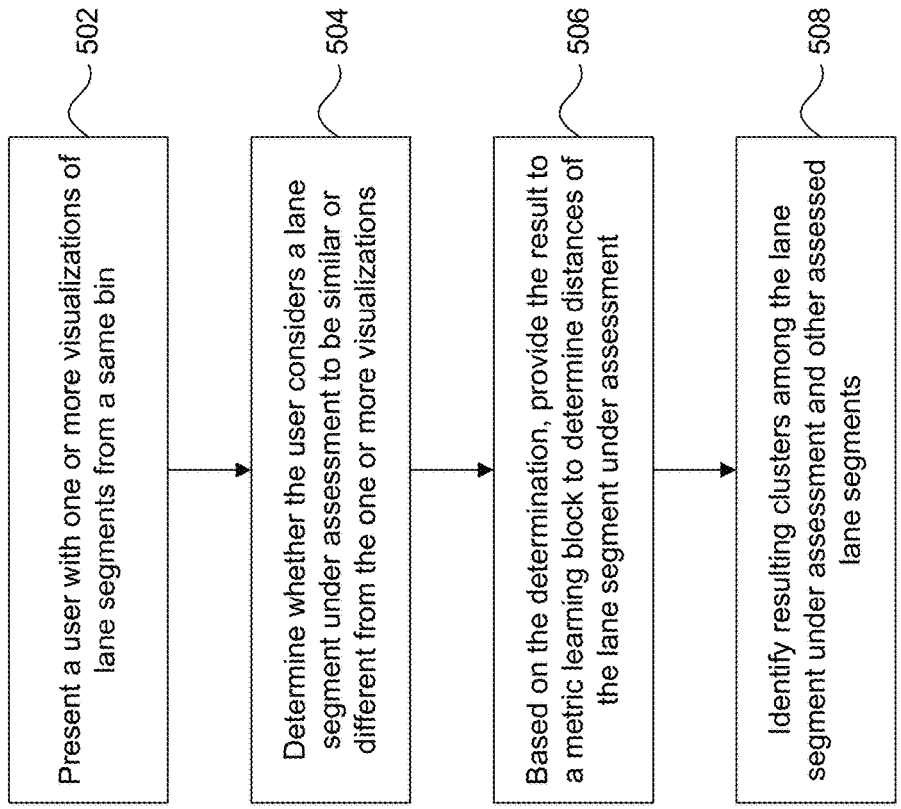
FIG. 5 is a flowchart illustrating steps for clustering lane segments using metric learning into protolanes, in accordance with aspects of the disclosure.

For further discussion of how to cluster lane segments into protolanes, lane segment clustering architecture can be reduced into just the assessment pertaining to a given bin of lane segments (i.e., lane segments where all of the hard distinctions have already been made, and they just need to be clustered based on the soft features). FIG. 5 is a flowchart 500 illustrating steps for clustering lane segments using metric learning into protolanes, in accordance with aspects of the disclosure. Noting that the lane segments involved here have already been binned according to hard features, the clustering approach of flowchart 500 allows for appropriate clustering based on the soft features of the lane segments.

At step 502, a user is presented with one or more visualizations of lane segments from within the same bin, in accordance with aspects of the disclosure. Then at step 504, a determination is made, for a lane segment under assessment, as to whether the user believes that the lane segment under assessment is or is not similar to the one or more visualizations of lane segments from within the same bin.

This information is used in a form of supervised learning that can be termed "weak" supervised learning, in order to ultimately learn the distances for lane segments based on individual soft features within learned distance function block 310 of FIG. 3. The user trains the learned distance function by providing labels that, on a holistic level, determine whether a lane segment is similar or not to others. However, the learned distance function must then separately assess what this means in terms of individual features. As a result, the user is removed from the challenging process of determining where to draw the line on the individual soft features, and can just assess the impact of different soft features as a whole.

Figure 6A:
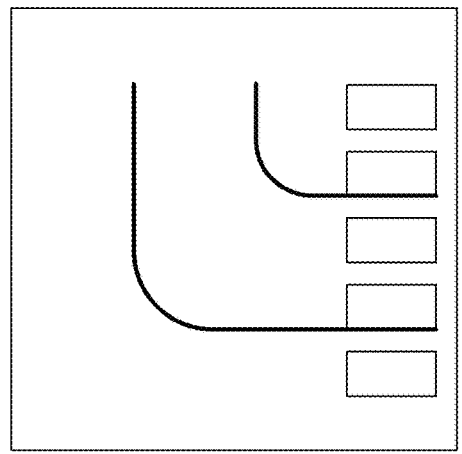
FIGS. 6A-6C illustrate exemplary user prompts for comparing lane segments in a supervised learning process, in accordance with aspects of the disclosure.
Figure 6A:
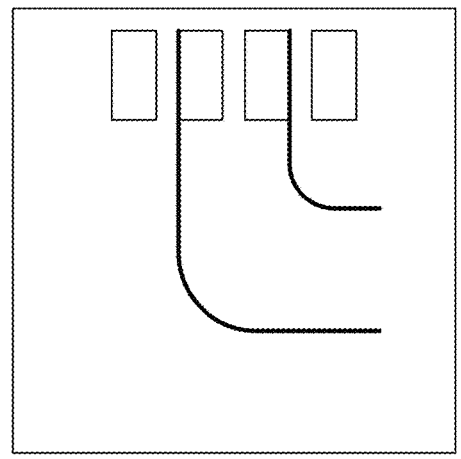
Figure 6B:
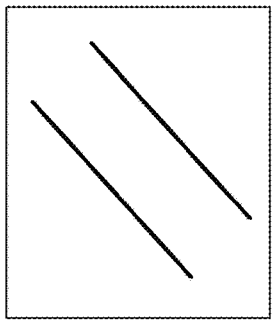
Figure 6B:
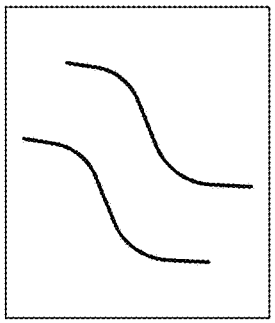
Figure 6B:
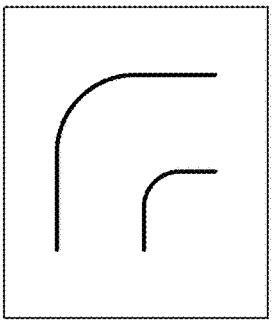
Figure 6B:
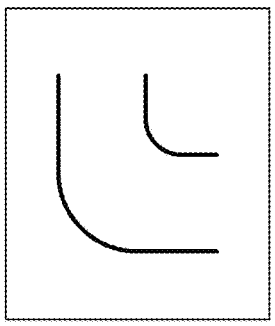
Figure 6C:
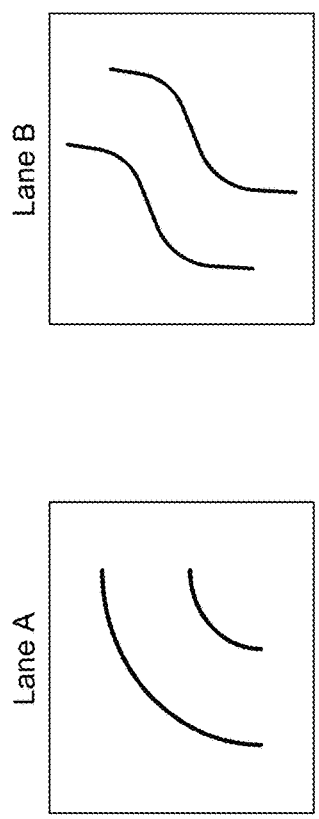
Figure 6C:
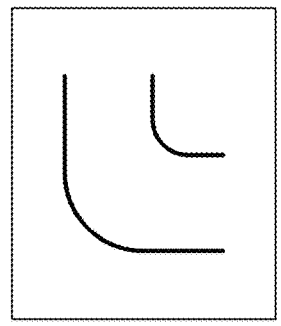

FIGS. 6A-6C illustrate exemplary user prompts 600A-600C for comparing lane segments in a supervised learning process, in accordance with aspects of the disclosure. User prompt 600A of FIG. 6A obtains the training label information on the basis of a binary assessment, essentially asking the user looking at two lane segments whether they should or should not be assigned to a same cluster, in accordance with aspects of the disclosure. User prompt 600B of FIG. 6B provides a similar approach, but asks the user to make multiple such binary assessments at once, looking for one or more similarities and considering whether the lane segment should be assigned to a same cluster as any of the similar lane segments, in accordance with aspects of the disclosure.

From here, a distance function can be learned through some form of contrastive loss. The distance between pairs with a positive label would be pushed to zero and the distance between pairs with a negative label would be pushed to some margin. One skilled in the relevant arts will appreciate that existing techniques for supervised contrastive learning can be applied here, and the distance function is not limited to any one such application.

User prompt 600C of FIG. 6C provides a ranking supervision approach, in accordance with aspects of the disclosure. This approach accounts for a further possible factor, which is that different users may have different priorities when it comes to assessing lane segments for equivalence more broadly as in the examples of user prompts 600A of FIG. 6A and 600B of FIG. 6B. On the other hand, this approach likely requires the presentation of additional such prompts in order for the data to converge into reasonably tight clusters. For example, by asking the user whether a lane segment is closer to lane segment A or lane segment B, this does not on its own explain exactly how close the user may have thought the lane segments were (versus a determination that the lane segments are equivalent, as in the other prompts). Alternatively, an optional selection for "all lanes are equivalent" in user prompt 600C may allow the result to converge more quickly in situations where the selection is applicable.

With the resulting information, and returning to FIG. 5, a metric learning block such as learned distance function block 310 of FIG. 3 can determine how to position a given lane segment within a space at step 506.

With a set of lane segments (e.g., lane segments within a geonet) for a given hard feature bin all placed within a certain space, clusters will emerge. These resulting clusters are identified at step 508 and, as appropriate, can be used to assign a given (or newly-created) protolane to each of the lane segments within the cluster.

The resulting number of clusters gives the resulting number of protolanes for the assessed set of lane segments, in accordance with aspects of the disclosure. The clustering based on the distance function can be further refined as appropriate (i.e., it is possible to decide how close a lane segment should be to other lane segments in order to be considered part of that cluster). This determination can be made in a variety of different ways, such as by determining a centroid for the cluster (defined in Euclidean space) and defining the cluster as all lane segments that are within a certain radius of the centroid, although one skilled in the relevant arts will appreciate that other approaches can be used.

Deciding the granularity of these clusters is based on determinations associated with testing protocols. As previously noted, the resulting number of protolanes, which become the basic unit for testing all lane segments, cannot be so high as to require an impractical number of tests, but also cannot be so low as to question the applicability of tests to all of the lane segments assigned to the protolane.

Typically, determining the granularity of the clusters is an engineering judgment. Protolanes are selected to cover a testing area (e.g., all protolanes within a given geonet). Decisions such as how many tests are desired over however many lane segments are present may therefore ultimately govern the granularity of these clusters. There is typically a useful vocabulary size of around 1,000 to 5,000 protolanes (i.e., clustered lane segments).

In order to assess whether the lane segments are clustered in a manner appropriate to the testing needs, one approach is to find some set of lane segments that are furthest apart within a cluster (e.g., the two lane segments that are furthest from each other) and present those samples to a testing engineer to determine whether those lane segments, from a testing perspective, should be clustered together. If they should not be clustered together, then either further training on distances may be needed (as in flowchart 500 of FIG. 5) to resolve any ambiguities in the results, or additional granularity can be introduced to reduce the cluster sizes and force those two lane segments to fall into different clusters. For example, a K-means clustering function can be adjusted to start with K=1,000, but raised from there if further granularity is needed.

This approach therefore simplifies the presentation of information to, and receipt of decisions from, users assessing similarities between lane segments, and engineers assessing the validity of testing protocols for protolanes. With this architecture, a significant and non-trivial portion of the creation of useful protolanes can be automated through a learning process.

Figure 7:
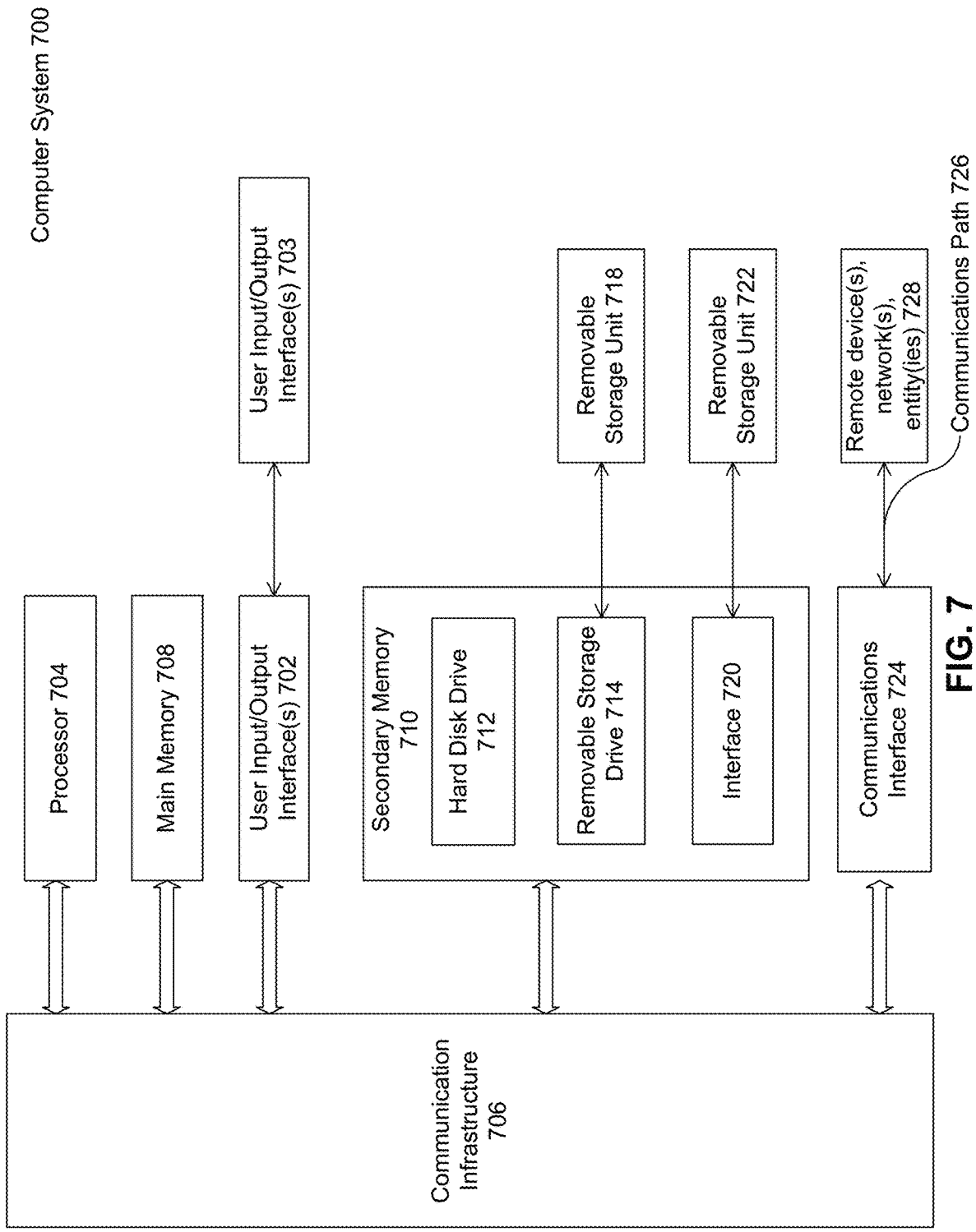
FIG. 7 is an example computer system useful for implementing various embodiments.

Various embodiments can be implemented, for example, using one or more computer systems, such as computer system 700 shown in FIG. 7. Computer system 700 can be any computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
grouping, by one or more computing devices, a set of lane segments based on trained labels from a supervised learning process, wherein the trained labels are applicable to a plurality of features of the set of lane segments;
calculating, by the one or more computing devices, distances corresponding to the set of lane segments based on individual features of the set of lane segments assessed by a metric learning model trained with the trained labels;
clustering, by the one or more computing devices, the set of lane segments based on the distances; and
assigning, by the one or more computing devices, corresponding protolanes to clusters of the set of lane segments based on the clustering, wherein an additional lane segment would be assigned to one of the protolanes based on clustering the additional lane segment into a corresponding one of the clusters.

2. The method of claim 1, further comprising:
presenting, by the one or more computing devices, two or more lane segments of the set of lane segments to a user;
determining, by the one or more computing devices, a similarity between the two or more lane segments of the set of lane segments based on a user input; and
assigning the trained labels to the two or more lane segments of the set of lane segments based on the similarity.

3. The method of claim 2, wherein the similarity between the two or more lane segments of the set of lane segments based on the user input is based on a ranking supervision approach.

4. The method of claim 1, further comprising:
binning, by the one or more computing devices, a plurality of lane segments into respective bins based on one or more hard features of the lane segments; and
selecting, by the one or more computing devices, the set of lane segments from a bin of the respective bins.

5. The method of claim 4, further comprising:
extracting, by the one or more computing devices, individual features of the plurality of lane segments; and
routing, by the one or more computing devices, hard features of the individual features of the plurality of lane segments to execution of the binning, and soft features of the individual features of the plurality of lane segments to execution of the distance calculation.

6. The method of claim 1, wherein the metric learning method utilizes a contrastive learning technique.

7. The method of claim 1, further comprising:
determining, by the one or more computing devices, two lane segments associated with a protolane within a cluster of the clusters of the set of lane segments, such that the two lane segments are furthest apart from each other;
receiving, by the one or more computing devices, a determination that the two lane segments should be assigned to disparate protolanes; and
re-clustering, by the one or more computing devices, the set of lane segments based on the distances in an increased number of clusters sufficient to place the two lane segments into separate clusters.

8. A system, comprising:
a memory; and
at least one processor coupled to the memory and configured to execute operations comprising:
grouping a set of lane segments based on trained labels from a supervised learning process, wherein the trained labels are applicable to a plurality of features of the set of lane segments,
calculating distances corresponding to the set of lane segments based on individual features of the set of lane segments assessed by a metric learning model trained with the trained labels,
clustering the set of lane segments based on the distances, and
assigning corresponding protolanes to clusters of the set of lane segments based on the clustering, wherein an additional lane segment would be assigned to one of the protolanes based on clustering the additional lane segment into a corresponding one of the clusters.

9. The system of claim 8, the operations further comprising:
presenting two or more lane segments of the set of lane segments to a user;
determining a similarity between the two or more lane segments of the set of lane segments based on a user input; and
assigning the trained labels to the two or more lane segments of the set of lane segments based on the similarity.

10. The system of claim 9, wherein the similarity between the two or more lane segments of the set of lane segments based on the user input is based on a ranking supervision approach.

11. The system of claim 8, the operations further comprising:
binning a plurality of lane segments into respective bins based on one or more hard features of the lane segments; and
selecting the set of lane segments from a bin of the respective bins.

12. The system of claim 11, the operations further comprising:
extracting individual features of the plurality of lane segments; and
routing hard features of the individual features of the plurality of lane segments to execution of the binning, and soft features of the individual features of the plurality of lane segments to execution of the distance calculation.

13. The system of claim 8, wherein the metric learning method utilizes a contrastive learning technique.

14. The system of claim 8, the operations further comprising:
determining two lane segments associated with a protolane within a cluster of the clusters of the set of lane segments, such that the two lane segments are furthest apart from each other;
receiving a determination that the two lane segments should be assigned to disparate protolanes; and
re-clustering the set of lane segments based on the distances in an increased number of clusters sufficient to place the two lane segments into separate clusters.

15. A non-transitory computer-readable medium having instructions stored thereon that, when executed by at least one computing device, cause the at least one computing device to perform operations comprising:

grouping a set of lane segments based on trained labels from a supervised learning process, wherein the trained labels are applicable to a plurality of features of the set of lane segments;

calculating distances corresponding to the set of lane segments based on individual features of the set of lane segments assessed by a metric learning model trained with the trained labels;

clustering the set of lane segments based on the distances; and assigning corresponding protolanes to clusters of the set of lane segments based on the clustering, wherein an additional lane segment would be assigned to one of the protolanes based on clustering the additional lane segment into a corresponding one of the clusters.

16. The non-transitory computer-readable medium of claim 15, the operations further comprising:

presenting two or more lane segments of the set of lane segments to a user;

determining a similarity between the two or more lane segments of the set of lane segments based on a user input; and assigning the trained labels to the two or more lane segments of the set of lane segments based on the similarity.

17. The non-transitory computer-readable medium of claim 16, wherein the similarity between the two or more lane segments of the set of lane segments based on the user input is based on a ranking supervision approach.

18. The non-transitory computer-readable medium of claim 15, the operations further comprising:

binning a plurality of lane segments into respective bins based on one or more hard features of the lane segments; and selecting the set of lane segments from a bin of the respective bins.

19. The non-transitory computer-readable medium of claim 18, the operations further comprising:

extracting individual features of the plurality of lane segments; and routing hard features of the individual features of the plurality of lane segments to execution of the binning, and soft features of the individual features of the plurality of lane segments to execution of the distance calculation.

20. The non-transitory computer-readable medium of claim 15, the operations further comprising:

determining two lane segments associated with a protolane within a cluster of the clusters of the set of lane segments, such that the two lane segments are furthest apart from each other;

receiving a determination that the two lane segments should be assigned to disparate protolanes; and re-clustering the set of lane segments based on the distances in an increased number of clusters sufficient to place the two lane segments into separate clusters.

* * * * *